United States Patent [19]

Ogawa et al.

[11] Patent Number: 4,541,638
[45] Date of Patent: Sep. 17, 1985

[54] EMERGENCY SHAFT SEAL DEVICE BY DEFORMATION OF PACKING RING

[75] Inventors: Takahisa Ogawa; Hirofumi Aritsubo, both of Sanda, Japan

[73] Assignee: Nipon Pillar Packing Co.. Ltd., Japan

[21] Appl. No.: 642,914

[22] Filed: Aug. 21, 1984

[30] Foreign Application Priority Data

Nov. 9, 1983 [JP] Japan ................................ 58-211439

[51] Int. Cl.⁴ .............................................. F16J 9/00
[52] U.S. Cl. ......................................... 277/9; 277/27
[58] Field of Search ..................... 277/9, 9.5, 34.3, 27

[56] References Cited

U.S. PATENT DOCUMENTS

| | | | |
|---|---|---|---|
| 2,849,070 | 8/1958 | Maly | 277/9.5 |
| 3,642,291 | 2/1972 | Zeffer et al. | 277/34 |
| 3,743,302 | 7/1973 | Bach et al. | 277/10 |
| 3,985,365 | 10/1976 | Catanzaro | 277/9 |
| 4,384,724 | 5/1983 | Derman | 277/3 |

Primary Examiner—Robert I. Smith
Attorney, Agent, or Firm—Jones, Tullar & Cooper

[57] ABSTRACT

This invention discloses an emergency shaft seal device wherein a packing ring of elastic material the inside diameter of which is larger than the outside diameter of a rotatable shaft is received in an annular groove along the periphery of the rotatable shaft to be free and not in contact with the rotatable shaft, and in the event of abnormal condition of a main shaft seal device used under the normal conditions, the packing ring is deformed by the pressure of a pressurized fluid applied to the outer periphery of the packing ring to be equally pressed to the periphery of the rotatable shaft so that the sealing is performed by the packing ring in place of main shaft seal.

14 Claims, 12 Drawing Figures

EMERGENCY SHAFT SEAL DEVICE BY DEFORMATION OF PACKING RING

BACKGROUND OF THE INVENTION (1) Field of the Invention

This invention relates to an emergency shaft seal device for use as a substitutional shaft seal in place of a main shaft seal device used in the normal operation in the event that the main shaft seal device gets into some abnormal condition.

(2) Description of the Prior Art

Several emergency shaft seal devices have been proposed up to the present in the art to which this invention is designated, and the typical one among them comprises a hollow elastic annular seal member provided along the periphery of a rotatable shaft. The outer periphery of the annular seal member is mounted onto the inner periphery of a seal housing, and a pressurized fluid such as air is fed into the hollow part of the seal member so that the inner periphery of the seal member is elastically and enlargedly deformed for press contact to the periphery of the rotatable shaft, thereby the area between the inner periphery of the seal housing and the rotatable shaft being sealed.

In the foregoing type of emergency shaft seal device, however, since the outer periphery of the seal member is mounted on the seal housing and the enlarging deformation of the inner periphery of the seal member using the pressurized fluid is almost constant in the circumferential direction, particularly in the event that the rotatable shaft is radially eccentric, a problem exists in that the inner periphery of the seal member deformed enlargedly is not sufficiently pressed in over the circumferential direction of the rotatable shaft resulting in the failure of exact sealing performance.

Moreover, in the event of occurence of a crack or shake in the seal member during the operation, the sealing performance will be rapidly and greatly lowered down to the fatal level.

Furthermore, although the emergency shaft seal device is essentially required to be a simple construction for easy inspection and maintenance as well as to be small in size, the device according to the foregoing conventional construction becomes inevitably complicated taking a rather large mounting space, resulting in the difficulty of providing a small-sized shaft seal device.

SUMMARY OF THE INVENTION (1) Objects of a Invention

An object of this invention is therefore to provide an emergency shaft seal device for simple and exact shaft sealing by a novel sealing method in which a packing ring of elastic material is deformed to be tightly pressed to the periphery of a rotatable shaft in place of a main shaft seal device in the event that the main shaft gets into abnormal condition.

A further object of this invention is to provide an emergency shaft seal device in which a shaft sealing operation is carried out by the packing ring even in the event of a radially eccentric rotatable shaft.

A still further object of this invention is to provide an emergency shaft seal device in which the sealing performance is not rapidly and greatly lowered down even in the event of producing some crack, shake or the like on the packing ring or seal member during the operation.

Another object of this invention is to provide an emergency shaft seal device of which construction is simplified and small-sized.

Still another object of this invention is to provide an emergency shaft seal device in which the maintenance and inspection are easily carried out and the shaft sealing operation in the event of abnormal condition is rapidly and easily performed.

Yet another object of this invention is to provide an emergency shaft seal device available for the wide range of use in association with the main shaft seal device, irrespective of the form, construction, etc. of the main shaft seal device.

An additional object of this invention is to provide an emergency shaft seal device performing a more effective shaft sealing operation using the packing ring by employing special shape or configuration in section thereof.

A still additional object of this invention is to provide an emergency shaft seal device performing a more effective and endurable sealing operation by coating or lining the surface of the packing ring with a lubricant of less frictional coefficient.

A yet additional object of this invention is to provide an emergency shaft seal device performing a smoother shaft sealing operation using the packing ring by employing a special shape or configuration of a receiving groove of the seal housing for receiving the packing ring and by coating or lining the sliding contact surface of the receiving groove with the packing ring with the lubricant of less frictional coefficient.

Other objects, features and advantages of this invention will become apparent in the course of the following description together with the accompanying drawings.

BRIEF DESCRIPTION OF THE DRAWINGS

In the accompanying drawings forming a part of this application, and in which like parts are designated reference numerals or characters throughout the same.

DESCRIPTION OF THE PREFERRED EMBODIMENTS

Referring now to the accompanying drawings some embodiments of the emergency shaft seal device in accordance with this invention are described in detail hereinafter. The embodiments illustrated in FIGS. 1 to 4 are the emergency shaft seal devices embodying this invention applied to a stern tube sealing.

Figure 1:
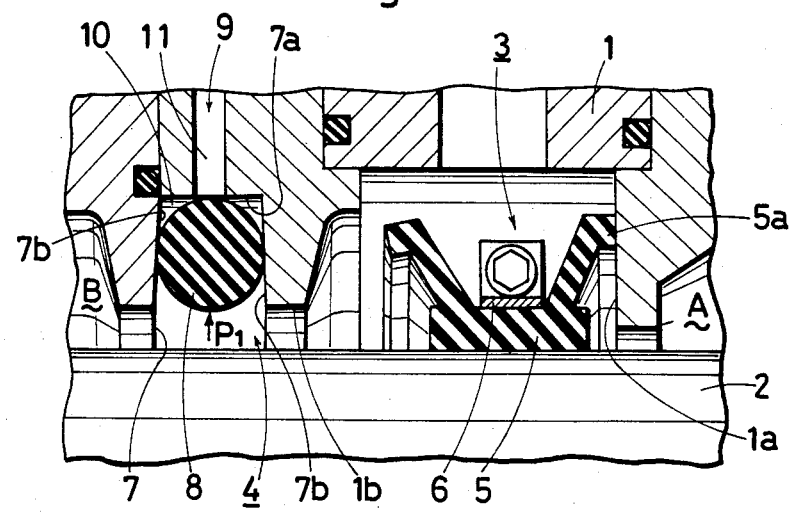
FIG. 1 is a vertical sectional side view of an essential part of an emergency shaft seal device in accordance with this invention.

In FIG. 1, there is shown an upper half part of a main shaft seal device 3 and an emergency shaft seal device 4 arranged in association with each other between a housing 1 and a rotatable shaft 2 lying therethrough.

The main shaft seal device 3 comprises an annular seal member 5 of synthetic rubber being π-shaped in section and fixedly engaged with the rotatable shaft 2 through a driving band 6 in such a manner that a lip portion 5a of the seal member 5 is resiliently pressed to a seal wall surface 1a so as to shield or seal the atmospheric air side A from the sealing fluid side or sea water side B by the relative rotational sliding contact at the contact area between said lip portion 5a and the seal wall surface 1a. In this connection, a pressing force of said lip portion 5a applied to the seal wall surface 1a is also given by the pressure of sea water.

On the other hand, the emergency shaft seal device 4 is arranged at the position near to said main shaft seal device 3 and nearer to the sea water side than the main shaft seal device 3.

The emergency shaft seal device 4 comprises an annular receiving groove 7 along the periphery of the rotatable shaft 2 formed on the circular inner periphery 1b of the seal housing 1, a packing ring 8 of such elastic material as synthetic rubber (NBR, BR, SBR, EPDN, for example), elastomer material of natural rubber, etc. The inside diameter of the packing ring 8 is adequately larger than the outside diameter of the rotatable shaft 2 to be received in said groove 7, and a pressing means 9 arranged on the side of the seal housing 1 for applying the pressurized fluid to the packing ring 8 deforming the same to be tightly pressed against the periphery of the rotatable shaft 2.

Said packing ring 8 is circular in section, and, moving in contact with the bottom face 7a of the receiving groove 7, is received into the groove 7 in such a manner as almost immersing into the same and a little compressed between both side wall surfaces 7b, 7b of the groove 7. Said receiving groove 7 is formed into a regular trapezoid in section gradually unfolding toward the rotatable shaft 2, and each side wall surface 7b is coated or linered by some lubricant such as fluororesin applied by means of painting or printing so that said deformation of the packing ring 8 in the groove 7 or the movement toward the rotatable shaft 2 is smoothly carried out.

Figure 4:
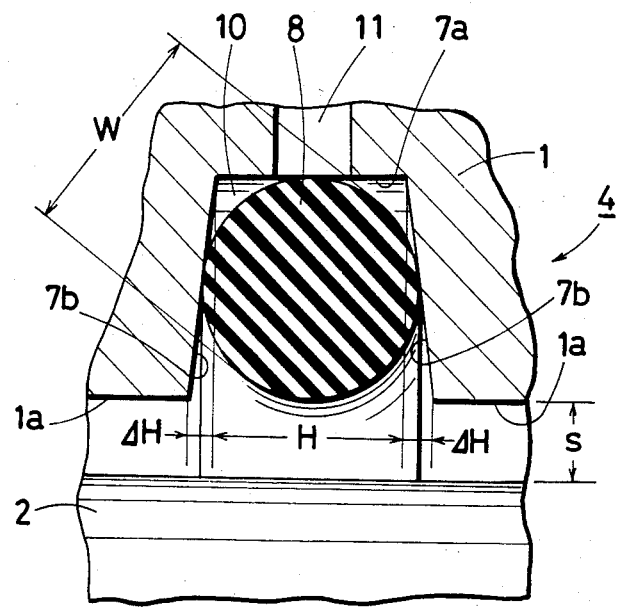
FIG. 4 is an enlarged view of the packing ring of FIG. 1.

As illustrated in FIG. 4, it is preferred that the width of said groove 7 or the width H of the bottom face 7a is set up to be a little smaller (a few millimeters) than the diameter in section of the packing ring 8. It is also preferred that the inclination of said each side wall surface 7b or the deformation variable ΔH in the direction along the axial direction of the rotatable shaft 2 is approximately H/20 to H/10 as illustrated in FIG. 4. It is necessary for the inlet part of the groove 7 for a spacing S between the inner periphery 1b of the seal housing 1 and the rotatable shaft 2 to be set up so that the packing ring 8 is not removed or does not get out of the groove 7 when the packing ring 8 is deformed to be tightly pressed to the periphery of the rotatable shaft 2. It is accordingly preferred that said spacing S is set up to be smaller than one half of the wire diameter W of the packing ring 8. Said spacing S, however, should not be unlimitedly minimized for the prevention of interference between the rotatable shaft 2 and the seal housing 1 caused by the radial eccentricity of the former and also for the protection against corrosion caused by the electric potential difference between the seal housing 1 and the rotatable shaft 2. It may be rather preferred that so far as the protection against elecro-corrosion is concerned, said spacing S is as large as possible within said preferable range.

The pressing means 9 comprises a feed port 11 for feeding the pressurized fluid formed in the seal housing 1 and communicating with a block space 10 surrounded by the bottom face 7a, the side wall surface 7b, 7b and the packing ring 8, and a pressurized fluid feeder such as an air compressor (not illustrated) connected with said feed port 11 so that the air pressurized to be an adequately higher pressure $P_2$ than the sea water pressure $P_1$ of the sea water side B is fed into said block space 10 from the feed port 11.

Figure 2:
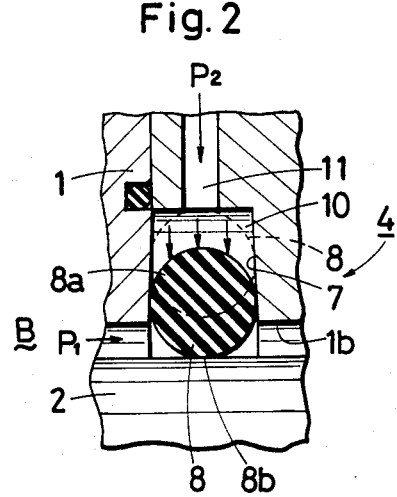
FIG. 2 is a schematic view of a packing ring in the operating condition and illustrating an essential part of FIG. 1.

Thus, when the air of pressure $P_2$ is fed into said block space 10, the packing ring 8 is pressed toward the center thereof by said air applied onto the outer periphery 8a of the packing ring 8 facing the block space 10. As a consequence, the packing ring 8 is deformed, the inner periphery 8b of the packing ring 8 is equally or evenly pressed to the full periphery of the rotatable shaft, and thus the sealing is carried out through said packing ring 8 between the seal housing 1 and the rotatable shaft 2 as illustrated in FIG. 2 and FIG. 3.

The pressure $P_2$ of the air applied onto the outer periphery 8a of the packing ring 8 to deform the same to be tightly pressed to the periphery of the rotatable shaft 2 is of course required to be set up higher than the pressure $P_1$ of sea water acting on the inner periphery 8b of the packing ring 8. In this case, for the sufficient sealing performance by the packing ring 8, it is preferred that the difference $\Delta P$ between the pressures $P_1$, $P_2$ is set up exceeding the lower limit value taking into account a factor of safety.

By the foregoing construction, in the event that any abnormal condition should occur in the main shaft seal device 3, the air of pressure $P_2$ is fed from the pressurized fluid feed port 11 to be applied onto the outer periphery 8a of the packing ring 8, the packing ring 8 is deformed from the state indicated by the chain line to the state indicated by the solid line, and the inner periphery 8b of the packing ring 8 is pressed tightly to the full periphery of the rotatable shaft 2, thereby the sealing from the sea water side B being sufficiently performed.

Figure 3:
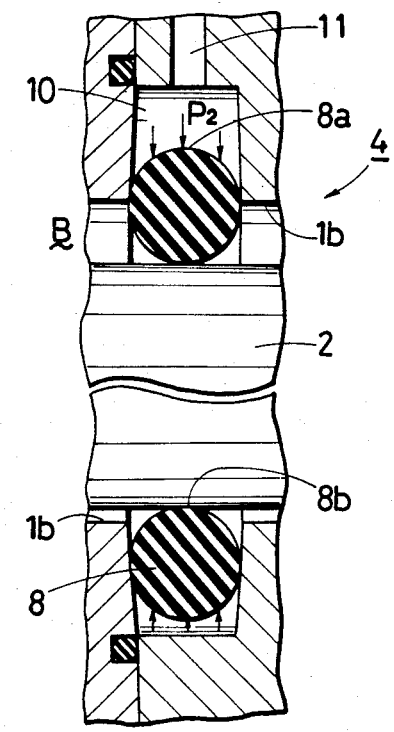
FIG. 3 is a vertical sectional side view of the packing ring in the operating condition in the event of radially eccentric rotatable shaft.

In this operation, since the packing ring 8 as a whole is freely movable inside the receiving groove 7, even in the event that the rotatable shaft 2 is radially eccentric caused by some error in assembling or by rolling, the packing ring 8 can follow or overcome the eccentricity as illustrated in FIG. 3 in such manner that the inner periphery 8b of the packing ring 8 is still equally or evenly pressed to the full periphery of the rotatable shaft 2 without negative influence on the sealing performance.

Also in the event that some crack or the like is produced on the packing ring 8, since the whole packing ring 8 is deformed to be tightly pressed to the periphery of the rotatable shaft 2, the sealing performance is not lowered at all by the production of the crack. Besides the sealing performance is kept on the high level since the packing 8 is made of such elastic material as synthetic rubber.

Further, since the packing ring 8 is simply received or accommodated in the receiving groove 7 formed on the inner periphery 1b of the seal housing 1, the construction of the emergency shaft seal device 4 is quite simple or simplified, and the mounting space thereof is greatly reduced, resulting in the small-sized emergency shaft seal device. This advantage is considerably important and useful since the emergency shaft seal device is not used under normal conditions.

Furthermore, since the packing ring 8 is not hollow in section and the volume thereof remains unchanged when it is deformed to be tightly pressed to the periphery of the rotatable shaft 2, the pressure $P_2$ of the air applied to the outer periphery 8a of the packing ring 8 acts on the rotatable shaft 2 as a pressing force or sealing force thereto as it is without damping. Consequently, it is unnecessary for the pressure $P_2$ of the air to be set up exceedingly higher beforehand. Additionally, since the sealing operation is performed by deforming the packing ring 8 of elastic material to be pressed tightly to the periphery of the rotatable shaft 2, the pressure proof is so sufficient that it is not necessary for the pressure control of the pressurized fluid used for the shaft seal to be carried out within a quite restricted small range. Thus, it is possible to use a simple pressure pump as a feeder of pressurized fluid like an air compressor, thereby trouble caused by misoperation is sufficiently prevented.

When the sealing operation using the emergency shaft seal device 4 becomes unnecessary, by stopping the air supply from the feed port 11 so as to make equal the pressure on the outer periphery 8a of the packing ring 8 to the same level as atmospheric pressure, the packing ring 8 recovers its original shape as before the deformation by its own elasticity and returns to its original position illustrated in FIG. 1 by the pressure of sea water acting on the inner periphery 8b of the packing ring 8. In this connection, it is of course possible to provide a separate means for the positive recovery operation.

Although, in principle, the emergency shaft seal device in accordance with this invention is substitutionally used for the provisional shaft seal in place of the main shaft seal device in the event of abnormal condition thereof, since the restraint or the binding force of the packing ring 8 is equally applied onto the rotatable shaft, the leakage is controllable by adjusting the pressure of the pressurized fluid. Further, permitting a small leakage, the emergency shaft seal device 4 is available for continuous operation like the main shaft seal device in the event of emergency.

Although in the foregoing description the emergency shaft seal device is supposed to be applied to the stern tube seal so that the sea water of the sea water side B is sealed in the event of the abnormal condition of the main shaft seal device 3 having the above-described construction, the emergency shaft seal device 4 in accordance with this invention is further available for every equipment to which the packing ring of elastic material such as synthetic rubber is applicable.

Figure 5:
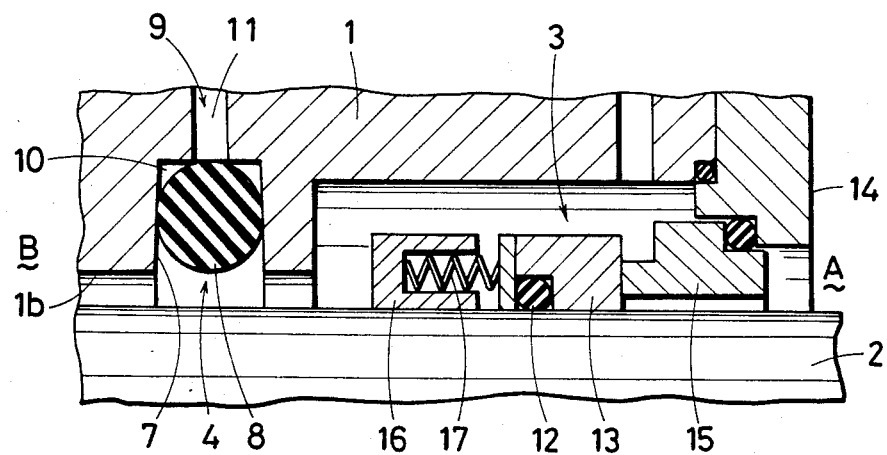
FIG. 5 is a vertical sectional view of the emergency shaft seal device in association with another main shaft seal device different from that of FIG. 1.

For example, as illustrated in FIG. 5, in the event of an abnormal condition of the main shaft seal device 3 of some mechanical seal type, the emergency shaft seal device embodying this invention is available for sealing the sealing fluid on the sealing fluid side B. In this embodiment the main shaft seal device 3 comprises a movable seal ring 13 slidably and non-rotatably supported on the rotatable shaft 2 in the axial direction thereof through an O ring 12, etc., a stationary seal ring 15 fixedly supported on the seal housing 1 through a retainer 14 and facing said movable seal ring 13 which turns in relation to the stationary seal ring 15, and a spring 17 inserted between a spring retainer 16 fixed to the rotatable shaft 2 and the movable seal ring 13 for pressing the movable seal ring 13 to the stationary seal ring 15. And the sealing operation is performed between the atmospheric air side A and the sealing fluid side B by the relative rotational sliding contact between the movable seal ring 13 and the stationary seal ring 15.

The emergency shaft seal device 4 is arranged at the position near to the sealing fluid side of said main shaft seal device 3. As the construction of each part of this emergency shaft seal device 4 is the same as the preceeding embodiment, the detailed description thereof is omitted here and designated the same reference numerals in FIG. 5.

In this manner, the emergency shaft seal device 4 in accordance with this invention can be installed in association with the main shaft seal device 3 irrespective of the type, construction, etc. thereof.

It is further possible to apply various devices for the smooth deformation of the packing ring 8 to be tightly pressed to the periphery of the rotatable shaft 2 as well as the smooth movement in the groove 7. For example, each side wall surface 7a of the groove 7 can be formed to be inclined and/or the lubricant of less frictional coefficient such as fluororesin can be applied to said each wall surface 7b by means of coating or lining as described in the preceeding embodiment. In particular, when applied the coating to the wall surface of the receiving groove 7 and to the inner periphery of the seal housing or the portion near the rotatable shaft 2, the protection against electro-corrosion is effectively achieved in cooperation with setting up said spacing S as large as possible. It is also possible either to coat the surface of the packing ring 8 with the lubricant or to form the packing ring 8 itself of some elastic material of less frictional coefficient. By applying said various devices, the frictional force on the rotatable shaft 2 is reduced or decreased, in other words, the antiwear resistance of the packing ring 8 is much improved resulting in an increase of durability. Every such device or method can be individually or collectively used for the smooth deformation of the packing ring 8 to be tightly pressed to the periphery of the rotatable shaft 2 accomplishing the effective shaft seal operation.

Figure 6:
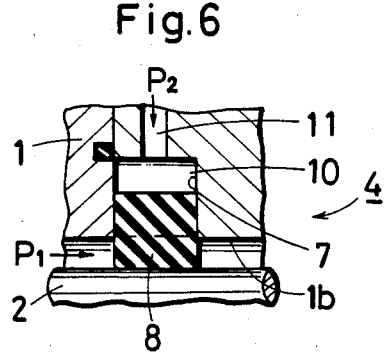
FIGS. 6 to 12 are sectional views of modifications of the packing ring, respectively.
Figure 7:
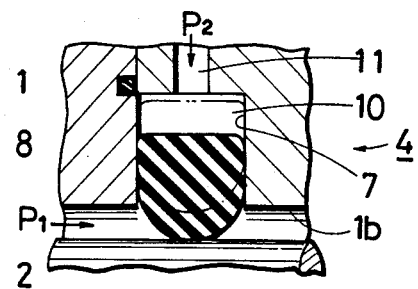
Figure 8:
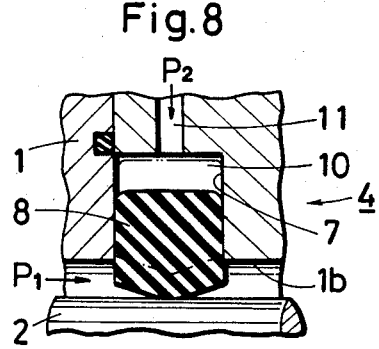
Figure 9:
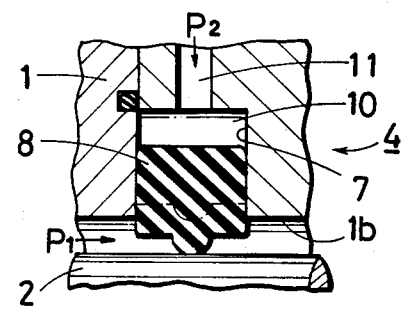
Figure 10:
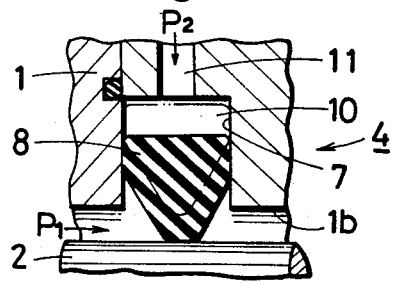
Figure 11:
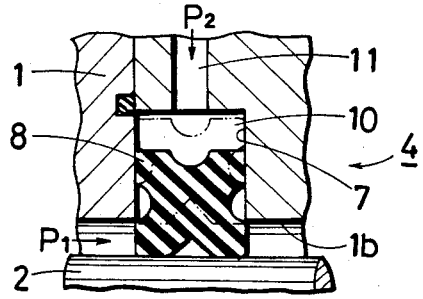
Figure 12:
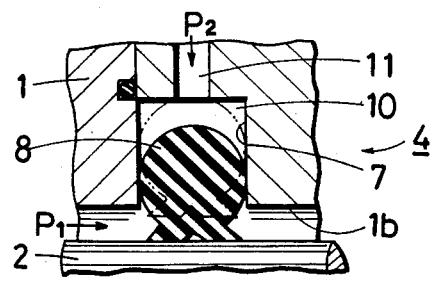

With regard to the shape in section of the packing ring 8, it is also possible to form it rectangular as illustrated in FIG. 6 or almost semi-circular as illustrated in FIG. 7 other than the circular. It is further possible to form the contact portion of the packing ring 8 contacting the rotatable shaft 2 into a convex or projection as illustrated in FIGS. 8 to 10, or into almost X-shape in section, or into a lip-like portion. By employing these formations, the contact pressure on the rotatable shaft 2 becomes higher when deforming the packing ring 8 to be tightly pressed to the periphery of the rotatable shaft 2 also resulting in the improvement of the sealing performance. In case of said various formations, it is also possible to cover or coat the surface of the packing ring 8 with the above-described lubricant, excluding the packing ring hollow in section.

Furthermore, in order to improve the durability by preventing the packing ring 8 as much as possible from abrasion by the contact with the rotatable shaft 2, it is one of the effective methods to coat the surface of the packing ring 8 with the lubricant of less friction. Moreover, other than such method, it is also possible to form or mold the packing ring 8 of any special elastic material including such reinforcing material as staple for the improvement of abrasion resistance, or to fit a slipper ring of less frictional coefficient of fluororesin or the like to the inner periphery of the packing ring 8 for the reduction of the friction between the rotatable shaft 2 and the packing ring 8. As a matter of course, it is necessary to make the shape of such slipper ring adaptable to the deformation of itself exactly following the deformation of the packing ring 8 to be tightly pressed to the periphery of the rotatable shaft 2, and further to adapt the manner of fitting the slipper ring to the packing ring 8 not to decrease the sealing performance of the packing ring 8.

The pressing means 9 for the deformation of the packing ring 8 to be tightly pressed to the periphery of the rotatable shaft 2 is not limited to said each embodiment, so far as the pressing means 9 can apply the pressurized fluid to the outer periphery 8a of the packing ring 8 and the pressure of said fluid is higher than the sealing fluid applied to the inner periphery 8b thereof (or the sealing fluid of which pressure is higher between the two fluids applied to the side A and the side B for the sealing by means of the main shaft seal device 3). As a matter of course, the pressurized fluid is not restricted to air, and such liquid as water is also available.

It is to be understood that this invention is not limited in its application to the details of construction and arrangement of parts illustrated in the accompanying drawings, since this invention is capable of other embodiments and of being practiced or carried out in various ways. Also it is to be understood that the phraselogy or terminology employed herein is for the purpose of description and not of limitation.

What is claimed is:

1. An emergency shaft seal device arranged in association with a main shaft seal device about a rotatable shaft, comprising:
   a seal housing having an inner periphery wherein an annular receiving groove is formed on the inner periphery along the periphery of the rotatable shaft;
   a packing ring of rubber material the inside diameter of which is larger than the outside diameter of the rotatable shaft and which is received in the receiving groove of the seal housing in such a manner as to be free and not in contact with rotatable shaft; and
   pressing means provided on the side of the seal housing and by which the packing ring is pressed and deformed by a pressurized fluid so as to be tightly pressed against the periphery of the rotatable shaft.

2. An emergency shaft seal device as claimed in claim 1, wherein the seal housing includes a seal wall surface formed thereon, and wherein said main shaft seal device comprises an annular seal member of elastic material having lip portions, said annular seal member being almost $\pi$-shaped in section and fixedly engaged with the rotatable shaft in such manner that one of said lip portions is elastically pressed onto the seal wall surface so that the sealing is performed by a relative sliding contact in the contact area between said lip portion and the seal wall surface.

3. An emergency shaft seal device as claimed in claim 1, wherein said main shaft seal device comprises a movable seal ring slidably and non-rotatably supported on the rotatable shaft in the axial direction thereof, a stationary seal ring fixedly supported on the seal housing, and an urging device for pressing said movable seal ring against the stationary seal ring so that sealing is performed by a relative sliding contact in the contact area between both seal rings.

4. An emergency shaft seal device as claimed in any of claim 1, 2 or 3, wherein the shape in section of said receiving groove on the seal housing is a trapezoid unfolding toward the rotatable shaft.

5. An emergency shaft seal device as claimed in claim 4, wherein the width H of the bottom face of said receiving groove on the seal housing is less than the cross-sectional length of the packing ring, the inclination of each side wall surface of said receiving groove being approximately $H/20$ to $H/10$, and the spacing between the opening side of the receiving groove and the periphery of the rotatable shaft being smaller than half of the length of the packing ring in section in the radial direction.

6. An emergency shaft seal device as claimed in claim 4 or claim 5, wherein at least each side wall surface of the receiving groove of the seal housing is coated or covered with a lubricant of less frictional coefficient.

7. An emergency shaft seal device as claimed in any of claim 1, 2, 3, 4, 5 or 6, wherein the shape of the packing ring in section is circular or substantially circular.

8. An emergency shaft seal device as claimed in any of claim 1, 2, 3, 4, 5 or 6, wherein the shape of the packing ring in section is substantially triangular.

9. An emergency shaft seal device as claimed in any of claim 1, 2, 3, 4, 5 or 6, wherein the shape of the packing ring in section is rectangular or substantially rectangular.

10. An emergency shaft seal device as claimed in any of claim 1, 2, 3, 4, 5 or 6, wherein the shape of the packing ring in section is substantially X-shaped.

11. An emergency shaft seal device as claimed in any of claim 1, 2, 3, 4, 5 or 6, wherein an annular projection or a lip portion is formed on the inner periphery of the packing ring.

12. An emergency shaft seal device as claimed in any of claim 1, 2, 3, 4, 5 or 6, wherein the surface of the packing ring is coated or covered with a lubricant of less frictional coefficient.

13. An emergency shaft seal device as claimed in claim 1, wherein a feed port is formed on the seal housing by the pressing means, said feed port communicating with a block space surrounded by the wall surface of the receiving groove and by the outer periphery of the packing ring, said feed part being connected with a pressurized fluid feeder.

14. An emergency shaft seal device as claimed in claim 13, wherein the pressurized fluid feeder is an air compressor.

* * * * *

UNITED STATES PATENT AND TRADEMARK OFFICE
CERTIFICATE OF CORRECTION

PATENT NO. : 4,541,638

DATED : September 17, 1985

INVENTOR(S) : Takahisa Ogawa et al.

It is certified that error appears in the above-identified patent and that said Letters Patent is hereby corrected as shown below:

Column 7, claim 1, line 40, between "with" and "rotatable" insert -- the --.

Column 7, claim 2, line 52, between "such" and "manner" insert -- a --.

Column 8, claim 13, line 53, "part" should read -- port --.

Signed and Sealed this

Fifteenth Day of April 1986

[SEAL]

Attest:

Attesting Officer

DONALD J. QUIGG

Commissioner of Patents and Trademarks